(12) United States Patent
Dong et al.

(10) Patent No.: US 10,126,577 B2
(45) Date of Patent: Nov. 13, 2018

(54) DISPLAY SUBSTRATE, DISPLAY PANEL AND DISPLAY DEVICE

(71) Applicants: BOE TECHNOLOGY GROUP CO., LTD, Beijing (CN); BEIJING BOE OPTOELECTRONICS TECHNOLOGY CO., LTD., Beijing (CN)

(72) Inventors: Tingze Dong, Beijing (CN); Xiuliang Wang, Beijing (CN); Zhinan Zhang, Beijing (CN); Xing Qin, Beijing (CN); Xuejiao Huang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/215,138

(22) Filed: Jul. 20, 2016

(65) Prior Publication Data

US 2017/0212370 A1    Jul. 27, 2017

(30) Foreign Application Priority Data

Jan. 27, 2016    (CN) .......................... 2016 1 0056081

(51) Int. Cl.
   *G02F 1/1333*    (2006.01)
   *G02F 1/1337*    (2006.01)

(52) U.S. Cl.
   CPC ...... *G02F 1/1333* (2013.01); *G02F 1/133784* (2013.01); *G02F 2001/133354* (2013.01)

(58) Field of Classification Search
   CPC .................. G02F 1/1333; G02F 2001/133354
   See application file for complete search history.

(56) References Cited

U.S. PATENT DOCUMENTS

| | | | |
|---|---|---|---|
| 2008/0158482 A1* | 7/2008 | Jang | C03B 33/033 349/73 |
| 2012/0200220 A1* | 8/2012 | Onishi | G02F 1/133351 313/504 |
| 2013/0235314 A1* | 9/2013 | Moriwaki | G02F 1/1333 349/124 |

FOREIGN PATENT DOCUMENTS

| | | |
|---|---|---|
| CN | 102645788 A | 8/2012 |
| CN | 104280939 A | 1/2015 |
| CN | 104280940 A | 1/2015 |
| CN | 104656318 A | 5/2015 |

(Continued)

OTHER PUBLICATIONS

First Chinese Office Action, for Chinese Patent Application No. 201610056081.6, dated Mar. 2, 2018, 16 pages.

*Primary Examiner* — Nathanael R Briggs
(74) *Attorney, Agent, or Firm* — Kinney & Lange, P.A.

(57) ABSTRACT

The present disclosure provides a display substrate, a display panel and a display device. The display substrate includes a base substrate and at least one layer formed on the base substrate, and the layer is formed with an alignment mark, which includes a dot array composed of a plurality of dots. With such dot array composed of the plurality of dots, a step or height difference between the alignment mark and portions of the layer around the alignment mark can be reduced, and adverse influence on the rubbing alignment caused by alignment mark can be reduced or eliminated, thereby reducing or eliminating rubbing Mura in the region where the alignment mark is located.

12 Claims, 2 Drawing Sheets

(56) References Cited

FOREIGN PATENT DOCUMENTS

| CN | 104977745 A | 10/2015 |
|---|---|---|
| CN | 105093697 A | 11/2015 |

\* cited by examiner

DISPLAY SUBSTRATE, DISPLAY PANEL AND DISPLAY DEVICE

CROSS-REFERENCE TO RELATED APPLICATION

This application claims the benefit of the Chinese Patent Application No. 201610056081.6 filed on Jan. 27, 2016 in the State Intellectual Property Office of China, the whole disclosure of which is incorporated herein by reference.

BACKGROUND OF THE INVENTION

Field of the Invention

Embodiments of the present disclosure generally relate to the field of liquid crystal display, and particularly, to a display substrate, a display panel and a display device.

Description of the Related Art

Liquid crystal display device (LCD) includes advantages such as small volume, low power consumption, relative lower manufacturing cost, no radiation or the like, and has been widely applied in various fields.

Display panel of the liquid crystal display device is generally processed through rubbing alignment, which provides the display panel with an alignment direction such that liquid crystal molecules can be arranged in a certain direction. Currently, a common problem present in liquid crystal display devices is Mura phenomenon caused due to the rubbing alignment (called as rubbing Mura).

The rubbing Mura relates to quality defect generated during the rubbing alignment process for the liquid crystal display device. Of course, there may be many means to reduce or eliminate most of the rubbing Mura phenomena. There is a particular rubbing Mura phenomenon present in a fixing region of a display substrate where an alignment mark is arranged; this rubbing Mura phenomenon is generated during the rubbing alignment due to the fact that the region where the alignment mark is located could not be provided with any better alignment effect under adverse influence of the alignment mark, and the rubbing Mura is hard to be removed from the fixing region, resulting in significant adverse influence on a display effect of a product. In prior arts, although the rubbing Mura in the fixing region may be improved by reducing lifetime of a rubbing cloth, improvement effect is not ideal and there is waste of resources.

SUMMARY

An object of the present disclosure is to provide a display substrate, a display panel and a display device, for solving the problems in prior arts that the rubbing Mura is hard to be removed from the region where the alignment mark of the display substrate is located and produces adverse influence on a display effect of the display device.

According to an embodiment of the present disclosure, there is provided a display substrate, including a base substrate and at least one layer formed on the base substrate, wherein the layer is formed with an alignment mark, which includes a dot array composed of a plurality of dots.

In this embodiment, the alignment mark is comprised of the dot array such that a step or height difference between the alignment mark and portions of the layer around the alignment mark can be reduced, and adverse influence on the rubbing alignment caused by the alignment mark can be reduced or eliminated, thereby reduced or eliminated, thereby reducing or eliminating rubbing Mura in the region where the alignment mark is located.

Preferably, the display substrate has a first alignment direction, a maximum number of dots of the dot array located within a plane and along a straight line extending in the first alignment direction is defined as a first direction dot number, and a maximum number of dots of the dot array located within the same plane and along a straight line extending in a direction perpendicular to the first alignment direction is defined as a second direction dot number, the second direction dot number being less than or equal to the first direction dot number.

Preferably, the dots of the dot array are spaced apart from each other by an interval greater than or equal to 12 microns.

Preferably, the maximum width or diameter of the dots of the dot array is in a range from 5 microns to 30 microns.

Preferably, a vertical projection of each dot of the dot array on the base substrate has a circular, elliptical, quadrate, diamond, regular pentagonal or regular hexagonal shape.

Preferably, the dots of the dot array include pits or recessed dots.

Preferably, the dots of the dot array include raised dots.

With the embodiment of the present disclosure, the alignment mark is comprised of the dot array such that a step or height difference between the alignment mark and portions of the layer around the alignment mark can be reduced, and adverse influence on the rubbing alignment caused by the alignment mark can be reduced or eliminated, thereby reducing or eliminating rubbing Mura in the region where the alignment mark is located.

According to an embodiment of the present disclosure, there is further provided a display panel, including the display substrate as described in the above embodiments.

With this embodiment of the present disclosure, the alignment mark formed on the layer of the display substrate is comprised of the dot array such that a step or height difference between the alignment mark and portions of the layer around the alignment mark can be reduced, and adverse influence on the rubbing alignment caused by the alignment mark can be reduced or eliminated, thereby reducing or eliminating rubbing Mura in the region where the alignment mark is located.

Preferably, the display substrate is selected from any one of an array substrate, a packaging cover plate arranged opposite to an array substrate, and a color filter substrate.

According to an embodiment of the present disclosure, there is further provided a display device, including the display panel as described in the above embodiments.

With this embodiment of the present disclosure, the alignment mark formed on the layer of the display substrate is comprised of the dot array such that a step or height difference between the alignment mark and portions of the layer around the alignment mark can be reduced, and adverse influence on the rubbing alignment process caused by the alignment mark can be reduced or eliminated, thereby reducing or eliminating rubbing Mura in the region where the alignment mark is located.

DETAILED DESCRIPTION OF PREFERRED EMBODIMENTS

Figure 1:
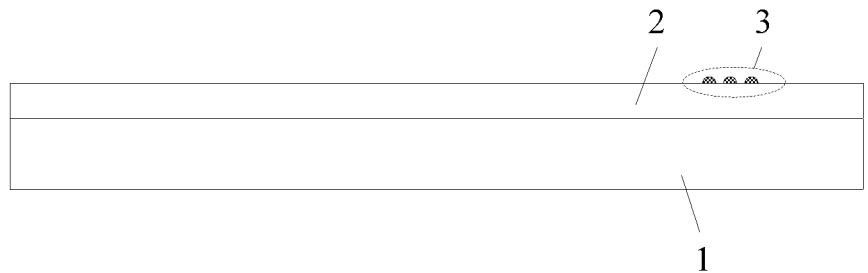
FIG. 1 is a partial sectional view schematically showing a structure of a display substrate according to an embodiment of the present disclosure.

Exemplary embodiments of the present invention will be described hereinafter in detail with reference to the attached drawings, wherein the like reference numerals refer to the like elements. The present invention may, however, be embodied in many different forms and should not be construed as being limited to the embodiment set forth herein; rather, these embodiments are provided so that the present invention will be thorough and complete, and will fully convey the concept of the disclosure to those skilled in the art.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1, a display substrate according to an embodiment of the present disclosure includes a base substrate 1 and at least one layer 2 formed on the base substrate 1, wherein the layer 2 is formed with an alignment mark 3 which includes a dot array.

In this embodiment, the alignment mark 3 is comprised of the dot array such that a step or height difference between the alignment mark 3 and portions of the layer 2 around the alignment mark 3 can be reduced, and adverse influence on the rubbing alignment caused by the alignment mark can be reduced or eliminated, thereby reducing or eliminating rubbing Mura in the region where the alignment mark 3 is located.

Figure 2:
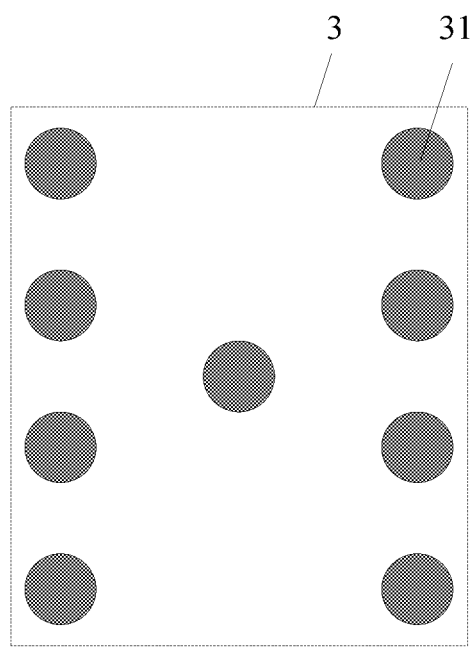
FIG. 2 is an enlarged top view schematically showing an alignment mark according to an embodiment of the present disclosure.

The dot array formed as the alignment mark 3 may include several dots 31 as shown in FIG. 2, the dot 31 may be designed such that its vertical projection or orthogonal projection on the base substrate 1 has a circular, elliptical, quadrate, diamond, regular pentagonal or regular hexagonal shape. Herein, the dot 31, which has a circular vertical projection or orthogonal projection on the base substrate 1, will be described as an example, and the similar principle is also applicable to other shapes.

Figure 3:
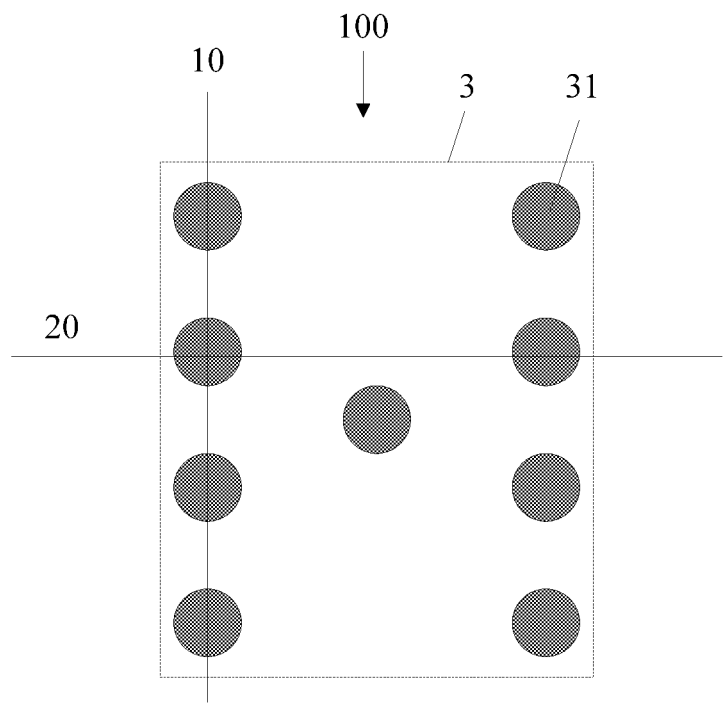
FIG. 3 is a schematic diagram showing dot numbers of the alignment mark shown in FIG. 2 in different directions.

The display substrate generally has a first alignment direction 100 as shown in FIG. 3. In order to reduce adverse influence of the alignment mark 3 on the rubbing alignment process, the dots 31 in the dot array of the alignment mark 3 may be arranged in the following way:

a maximum number of dots 31 of the dot array located within a plane and along a straight line extending in the first alignment direction 100 is defined as a first direction dot number, and a maximum number of dots 31 of the dot array located within the same plane and along a straight line extending in a direction perpendicular to the first alignment direction 10 is defined as a second direction dot number, the second direction dot number being less than or equal to the first direction dot number.

For example, in an example shown in FIG. 3, a straight line 10 is located within a plane and extends in the first alignment direction 100, and a straight line 20 is located within the same plane and extends in a direction perpendicular to the first alignment direction 100, a maximum number of the dots 31 through which the straight line 10 passes is defined as the first direction dot number, which is four, while a maximum number of the dots 31 through which the straight line 20 passes is defined as the second direction dot number, which is two. Obviously, the first direction dot number is larger than the second direction dot number. As such, firstly, it will facilitate reduction in step or height difference between the alignment mark 3 shown in FIG. 3 and portions therearound, thereby reducing adverse influence on rubbing alignment process while reducing wear of the rubbing cloth; further, since the number of the dots 31 which are arranged in the direction perpendicular to the first alignment direction 100 and will obstruct the rubbing cloth is smaller, it will also facilitate to reduce adverse influence on the rubbing alignment process while reducing wear of the rubbing cloth.

Figure 4:
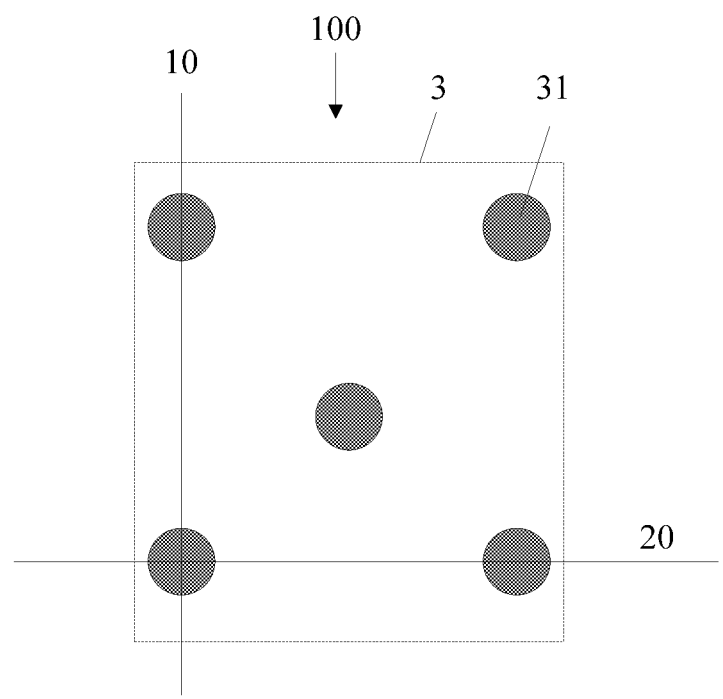
FIG. 4 is a schematic diagram showing dot numbers of an alignment mark in different directions, according to another embodiment of the present disclosure.

Further, in an example shown in FIG. 4, for example, a straight line 10 is located within a plane and extends in the first alignment direction 100, and a straight line 20 is located within the same plane and extends in a direction perpendicular to the first alignment direction 100, a maximum number of the dots 31 through which the straight line 10 passes is defined as the first direction dot number, which is two, while a maximum number of the dots 31 through which the straight line 20 passes is defined as the second direction dot number, which is two, that is, the first direction dot number is equal to the second direction dot number. It will also facilitate reduction in step or height difference between the alignment mark 3 shown in FIG. 4 and portions therearound, thereby reducing adverse influence on rubbing alignment process while reducing wear of the rubbing cloth.

Of couses, the dots 31 of the alignment mark 3 may includes raised dot, or pits or recessed dots. As shown in FIG. 1, the dot 31 is a raised dot. In practice, the alignment mark 3 may remain after manufacturing of the display substrate is finished, or may be removed during manufacturing the display substrate. Generally, if it is desired to remain the alignment mark 3 on the layer 2, the raised dot may be used, as shown in FIG. 1; if it is not desired to remain the alignment mark 3 on the layer 2, the pit may be used, which will not be repeatedly described.

In order that the alignment mark 3 not only functions in alignment, but also can reduce the step or height difference between the alignment mark and portions therearound so as reduce adverse influence on rubbing alignment process, the dot array may be arranged such that the dots 31 are spaced apart from each other by an interval greater than or equal to 12 microns and the maximum width or diameter of the dots 31 is in a range from 5 microns to 30 microns.

It is noted that although the above embodiments of the present disclosure are only described with reference to FIG. 1 showing one layer 2, the display substrate may be formed thereon with a plurality of layers 2, some or all of which may be provided with the alignment mark 3 comprised of the dot array according to embodiments of the present disclosure, which will no be repeatedly described herein.

In the embodiments of the present disclosure, the alignment mark is comprised of the dot array such that a step or height difference between the alignment mark and portions of the layer around the alignment mark can be reduced, and adverse influence on the rubbing alignment can be reduced or eliminated, thereby reducing or eliminating rubbing Mura in the region where the alignment mark is located.

An embodiment of the present disclosure further provides a display panel, including the display substrate according the embodiments as described above.

With this embodiment of the present disclosure, the alignment mark formed in the layer on the display substrate is comprised of the dot array such that a step or height difference between the alignment mark and portions of the layer around the alignment mark can be reduced, and adverse influence on the rubbing alignment can be reduced or eliminated, thereby reducing or eliminating rubbing Mura in the region where the alignment mark is located.

Preferably, the display substrate is an array substrate; or, the display substrate is a packaging cover plate arranged opposite to an array substrate ; or, the display substrate is a color filter substrate.

An embodiment of the present disclosure further provides a display device, including the display pane according the embodiment as described above.

With this embodiment of the present disclosure, the alignment mark formed in the layer on the display substrate is comprised of the dot array such that a step or height difference between the alignment mark and portions of the layer around the alignment mark can be reduced, and adverse influence on the rubbing alignment can be reduced or eliminated, thereby reducing or eliminating rubbing Mura in the region where the alignment mark is located.

Although several exemplary embodiments have been shown and described, it would be appreciated by those skilled in the art that various changes or modifications may be made in these embodiments without departing from the principle and spirit of the disclosure, the scope of which is defined in the claims and their equivalents.

What is claimed is:

1. A display substrate for a liquid crystal display device containing liquid crystal molecules therein, the display substrate comprising a base substrate and at least one layer formed on the base substrate, wherein the layer is formed with an alignment mark in a fixing region of the display substrate, and wherein the alignment mark comprises a dot array composed of a plurality of dots arranged in a plurality of rows and a plurality of columns; wherein:

the display substrate has a first rubbing alignment direction in which the liquid crystal molecules processed through rubbing alignment are arranged; and a maximum number of dots of the dot array located within a same plane and along a straight line extending in the first rubbing alighment direction is defined as a first direction dot number, and a maximum number of dots of the array located within the same plane and along a straight line extending in a direction perpendicular to the first rubbing alignment direction is defined as a second direction dot number, the second direction dot number being less than the first direction dot number.

2. The display substrate according to claim 1, wherein the dots of the dot array are spaced apart from each other by an interval greater than or equal to 12 microns.

3. The display substrate according to claim 2, wherein a maximum width or diameter of the dots of the dot array is in a range from 5 microns to 30 microns.

4. The display substrate according to claim 1, wherein the dots of the dot array are spaced apart from each other by an interval greater than or equal to 12 microns.

5. The display substrate according to claim 4, wherein a maximum width or diameter of the dots of the dot array is in a range from 5 microns to 30 microns.

6. The display substrate according to claim 1, wherein a vertical projection of each dot of the dot array on the base substrate has a circular, elliptical, quadrate, diamond, regular pentagonal or regular hexagonal shape.

7. The display substrate according to claim 1, wherein the dots of the dot array comprise recessed dots.

8. The display substrate according to claim 1, wherein the dots of the dot array comprise raised dots.

9. A display panel, comprising the display substrate according to claim 1.

10. The display panel according to claim 9, wherein the display substrate is selected from any one of an array substrate, a packaging cover plate arranged opposite to an array substrate, and a color filter substrate.

11. A display device, comprising the display panel according to claim 9.

12. A display device, comprising the display panel according to claim 10.

* * * * *